Figure 1:
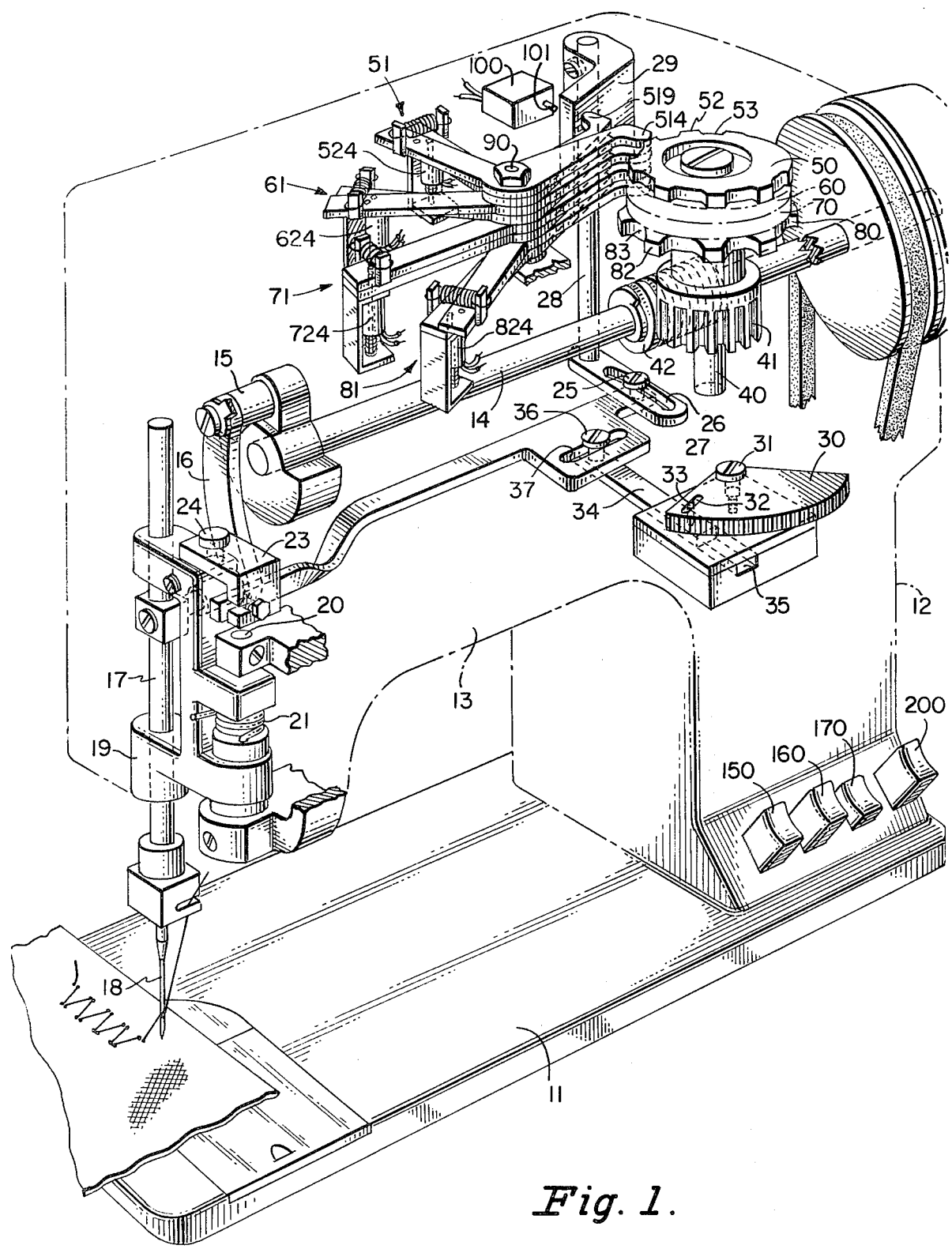

United States Patent [19]
Cook et al.

[11] 3,874,312

[45] Apr. 1, 1975

[54] ELECTRIC CAM SELECTOR MECHANISM FOR SEWING MACHINES

[75] Inventors: Albert N. Cook, Madison; Alfred R. Suchsland, Morris Plains, both of N.J.

[73] Assignee: The Singer Company, New York, N.Y.

[22] Filed: Jan. 23, 1974

[21] Appl. No.: 436,018

[52] U.S. Cl. ...... 112/158 C, 112/158 E, 74/483 PB
[51] Int. Cl. .............................................. D05b 3/02
[58] Field of Search ........ 112/158 R, 158 A, 158 B, 112/158 D, 158 E; 74/567, 568 R, 568 M, 568 T, 569, 483 PB; 66/50 B, 154 B

[56] References Cited
UNITED STATES PATENTS

| 2,517,079 | 8/1950 | Birdsall | 112/158 E |
| 2,924,107 | 2/1960 | Fresard et al. | 112/158 E X |
| 3,076,066 | 1/1963 | Caron | 112/15 E X |
| 3,217,677 | 11/1965 | Eguchi | 112/158 |
| 3,724,240 | 4/1973 | Flad | 66/50 B |

*Primary Examiner*—Werner H. Schroeder
*Attorney, Agent, or Firm*—Marshall J. Breen; Chester A. Williams, Jr.; Robert E. Smith

[57] ABSTRACT

A sewing machine is disclosed having a plurality of pattern cams each influencing a mechanical cam follower unit to produce a different pattern of stitch formation together with a cam selector mechanism including operator influenced electric switches on said sewing machine one corresponding to each pattern cam for initiating and maintaining any selected one of said pattern cams effective.

9 Claims, 7 Drawing Figures

3,874,312

ELECTRIC CAM SELECTOR MECHANISM FOR SEWING MACHINES

BACKGROUND OF THE INVENTION

In stitch patterning systems utilizing data retrieved from an electronic memory storage system or the like, it has been known to select discrete stitch patterns by an electrical system which, for instance, selectively addresses the memory storage bank as disclosed in the U.S. Pat. application, Ser. No. 376,781, filed July 5, 1973 and assigned to a common assignee. This known electrical system for selecting electronically stored stitch pattern information is not, however, adapted for use in selecting pattern cams with mechanical followers.

SUMMARY OF THE INVENTION

It is an object of this invention to provide a cam selector mechanism for a sewing machine employing a plurality of pattern cams and a mechanical cam follower system which cam selector mechanism may be operated by the selective closure of electric switches to effect a rapid and smooth transition from one to another of the pattern cams. This object of the invention is attained by the provision of a novel follower system for each of the plurality of pattern cams including relatively shiftable follower portions which may be selectively unified by an electrically operated locking device in a relative position effective to transmit pattern cam influenced movement.

It is also an object of this invention to provide an electrically operated locking device for a pattern cam selector of the above character which utilizes a minimum of electrical energy. This object is attained by the provision of an electromagnetic locking plunger for unifying the follower portions, and means for biasing said follower portions into said unified position in one extreme position of follower throw influenced by said pattern cam.

A further object of this invention is to provide a pattern selector of the above character in which the transition of effectiveness from one pattern cam to another is effected rapidly regardless of the stitch pattern selected. This object of the invention is attained by the provision of a special cam and follower unit identical to any of the pattern cam and follower units but designed not for pattern stitching but instead for facilitating the rapid locking of the selected pattern cam follower unit. For this purpose the locking device of the follower unit for the special cam is arranged to be energized for only a short period usually less than two stitches beginning simultaneously with any pattern cam selection.

Figure 2A:
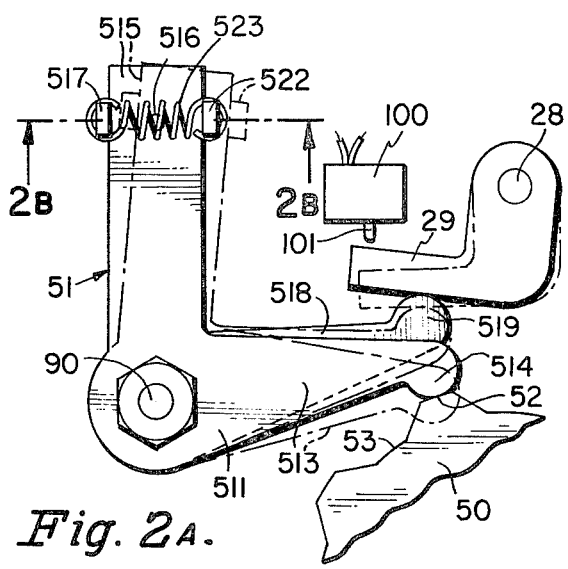
Figure 3A:
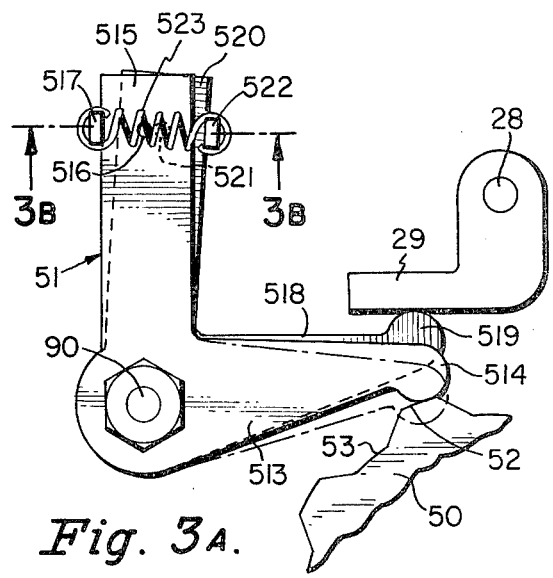
Figure 2B:
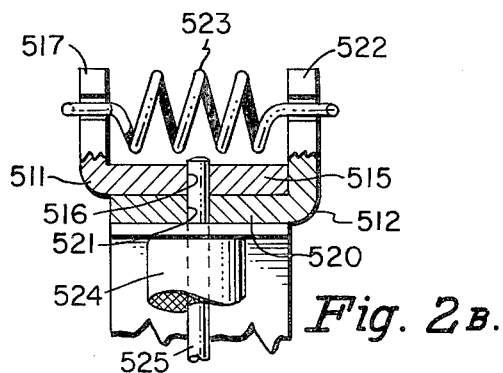
Figure 3B:
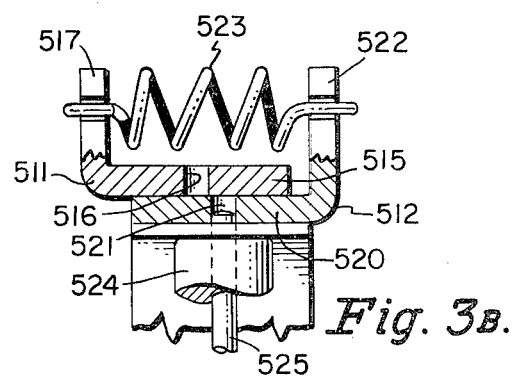
Figure 5:
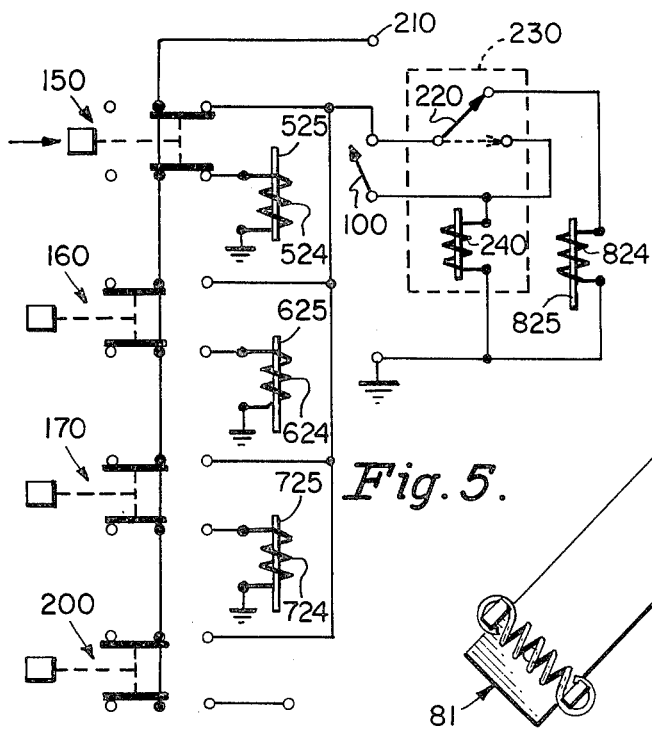
Figure 4:
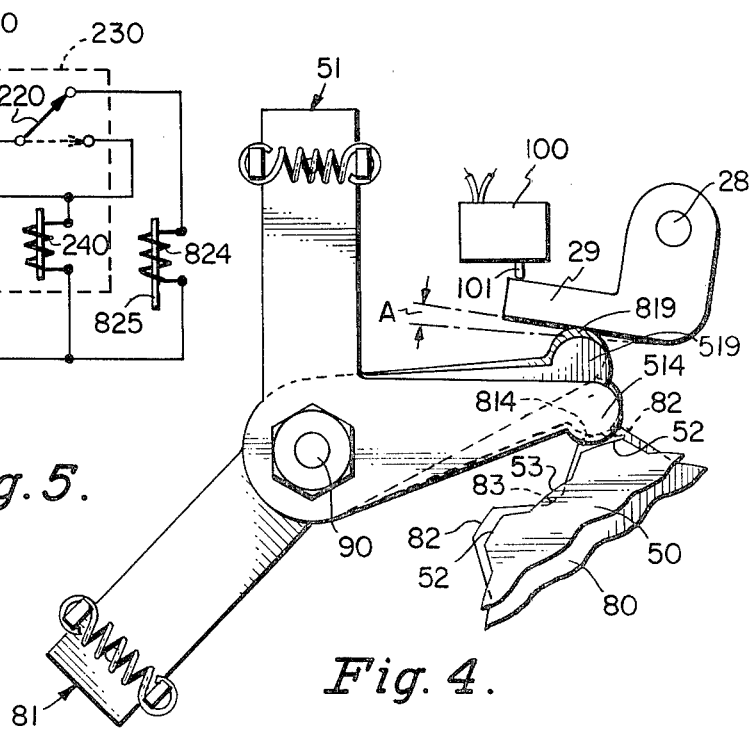

With the above and additional objects and advantages in view, as will hereinafter appear, this invention comprises the devices, combinations and arrangements of parts hereinafter described and illustrated in the accompanying drawings of a preferred embodiment in which:

FIG. 1 is a perspective view of a sewing machine with portions of the machine frame illustrated in phantom lines to illustrate this invention applied thereto, FIG. 2A is an enlarged top plan view of a pattern cam and follower unit therefor with the follower unit shown locked in relative position effective to transmit pattern cam influenced motion, FIG. 2B is an enlarged cross-sectional view taken substantially along line 2B—2B of FIG. 2A, FIG. 3A is a view similar to FIG. 2A but showing a cam follower unit with the follower parts unlocked, FIG. 3B is an enlarged cross-sectional view taken substantially along line 3B—3B of FIG. 3A, FIG. 4 is an enlarged top plan view of a pattern cam follower unit together with a special cam follower unit both shown locked in relative positions effective to transmit pattern cam influenced motion, and FIG. 5 is a circuit diagram showing an electrical arrangement suitable for operating the pattern cam selector mechanism of the invention.

Referring to the accompanying drawings, this invention is illustrated as applied to a pattern cam mechanism for influencing the amplitude of zigzag stitching, although it will be understood that it will have equal utility with pattern cam mechanisms for influencing other aspects of stitch formation such as needle position, work feed, or any combination thereof.

The sewing machine illustrated in FIG. 1 includes a frame having a bed 11 from which rises a standard 12 supporting a bracket arm 13 overhanging the bed. An arm shaft 14 journaled in the bracket arm carries a crank 15 connected by a drive link 16 for imparting endwise reciprocation to a needle bar 17 to which a thread carrying needle 18 is affixed. The needle bar 17 is slidably supported in a gate 19 oscillatable on a pivot pin 20 carried on the bracket arm so that lateral jogging movement may be imparted to the needle. A spring 21 serves to bias the gate 19 in a clockwise direction as viewed in FIG. 1 and the lateral position of the gate in opposition to the spring is influenced by a drive link 22 secured to a bracket 23 pivoted at 24 to the gate. The drive link 22 at the other extremity carries a pivot pin 25 accommodated along a radial slot 26 formed in a rock arm 27 fast on a rock shaft 28 journaled in the bracket arm 13. The rock shaft 28 also has fast thereon a wobble plate 29.

A bight adjusting dial 30 pivoted as at 31 in the bracket arm includes a radial slot 32 embracing a pin 33 extending from a connecting slide 34 which is slidably constrained in a guide slot 35 in the bracket arm and carries a pin 36 accommodated in a slot 37 formed lengthwise in the drive link 22. By this arrangement, turning of the dial 30 serves to shift the pivot pin 25 on the drive link 22 along the slot 26 thus to control the width of zigzag movements imparted to the needle.

A cam shaft 40 is journaled in the bracket arm and carries a worm wheel 41 drivingly engaging a worm 42 on the arm shaft. A plurality of pattern cams 50, 60, and 70 are carried on the cam shaft in a stack as well as a special cam 80 as will be described in greater detail below.

Cooperating with each one of the pattern cams 50, 60 and 70 and with the special cam 80 and serving selectively to transmit motion from these cams to the wobble plate 29 is an individual pattern cam follower unit designated generally at 51, 61, 71 and 81 respectively. Each of the follower units is identical in construction and operation, the only difference being the angular arrangement of the locking arms relatively to the follower arms which provides for a spiral assembly as shown in FIG. 1 accommodating the control solenoids without interference one with the other. Since the follower units are alike, only that one 51 cooperating with the top pattern cam 50 will not be described in detail and the parts will be identified in the drawings by three digit reference characters, of which the first digit corresponds to the first digit of the general designation of the cam follower unit. Like parts of the cam follower units will be designated by like second and third digits in the reference characters.

The follower unit 51 comprises a pair of bell crank levers 511 and 512 freely pivoted on a common fulcrum pin 90 carried in the bracket arm 13. The bell crank lever 511 includes a cam follower bell crank arm 513 terminating in an inturned cam follower finger 514 and a locking bell crank arm 515 formed with a locking aperture 516 and with an upturned ear 517. The bell crank lever 512 includes a bell crank arm 518 terminating in an outturned finger 519 facing the wobble plate 29 and a locking arm 520 formed with a locking aperture 521 and also with an upturned ear 522. A spring 523 is stretched between the ears 517 and 522 serving to bias the locking arms together. Furthermore, the ears 517 and 522 as shown in FIG. 2B are arranged to locate the locking arms 515 and 520 relative to each other with the locking apertures 516 and 521 in alignment when the locking arms are biased together by the spring 523. Secured beneath the locking arm 520 is an electric motor means in the form of a solenoid 524 having an armature rod 525 arranged to be retracted into the locking aperture 521 when the solenoid is deenergized as shown in FIG. 2B, the armature rod 525 is shiftable into the locking aperture 516 when the solenoid is energized as shown in FIG. 3B.

It will be appreciated that as described thus far, the solenoid armature rod 525 will enter the locking aperture 516 to lock the bell cranks 511 and 512 together only when the apertures 516 and 521 are next shifted into alignment after the solenoid is energized. Such alignment of the apertures 516 and 521 will take place only when sufficient clearance exists between the wobble plate 29 and the pattern cam. Such sufficient clearance can occur, for instance, when the finger 514 tracks any pattern cam surface of sufficiently small radial dimension that the pattern cam has no influence upon the wobble plate 29.

Such sufficient clearance can also occur when the cam follower unit 81 becomes effective and shifts the wobble plate 29 to an extreme position beyond that which it normally occupies during zigzag sewing.

FIG. 4 illustrates the cam follower unit 81 tracking the special pattern cam 80 together with the cam follower unit 51 shown tracking the pattern cam 50. For illustrative purposes, the pattern cam 50 in FIG. 4 is shown with alternate high cam lobes 52 and low cam stations 53 dimensioned so as to influence the greatest lateral excursion for which the needle jogging and stitch forming mechanisms of the sewing machine are designed to operate. It will be appreciated, however, that the pattern cams 50, 60 and 70 may be formed with any desired cam track and may, for instance, have no cam stations for influencing such greatest lateral excursion.

By comparison, FIG. 4 illustrates that the special pattern cam 80 is formed with alternate high cam lobes 82 which are slightly higher, that is, they extend radially outward beyond the highest pattern cam lobes 52, and with alternate low cam stations 83 which are slightly lower, that is, they extend radially inward beyond the lowest cam station 53 of the pattern cams. As a result, when the solenoid 824 of the special cam follower unit 81 is energized, the locking apertures 816 and 821 will align with certainty when the cam follower finger 814 next tracks a low cam station 83 so that the solenoid rod 825 will shift into the locking aperture 816 with certainty. On the succeeding stitch, the cam follower unit 81 in tracking the high cam lobe 82 will shift the wobble plate 29 an augmented increment farther away from the cam stack. This augmented increment is illustrated and labeled A in FIG. 4.

The effect of this augmented increment of wobble plate movement is to provide a clearance between the wobble plate and the cam stack for all of the other pattern cam follower units to shift with certainty into positions in which the locking apertures, for instance, apertures 516 and 521 of follower unit 51, may be brought into alignment by the spring 523. Whichever solenoid 524, 624 and 724 is energized the corresponding solenoid rod can shift with certainty and lock that pattern cam unit in effective position to transmit pattern cam information thereafter to the wobble plate.

As shown in FIGS. 1, 4 and 2A, an electrical switch 100 is carried on the machine frame and includes an operating plunger 101 responsive to the augmented position of the wobble plate. Preferably the switch 100 is normally open and is closed only in the augmented position of the wobble plate.

For selectively rendering any one of the pattern cams 50, 60 or 70 effective, three electric push button switches 150, 160 and 170 are provided on the machine frame. An additional push button electrical switch 200 is provided and serves to establish a condition in which none of the pattern cams is effective so that a straight stitching condition will result.

The electrical switches 150, 160, 170 and 200 may comprise a conventional push button interlocking switch such as a commercially available UID Series 5 push button interlocking switch. With such a conventional switch device, the initial movement of depression of any of the push buttons will automatically release any push button which had previously been locked in depressed position and continued depression will result in locking of the newly selected push button in fully depressed position.

FIG. 5 illustrates an electrical circuit and the electrical components which may be used to effect the pattern cam selection in accordance with the present invention. In FIG. 5 the push button switches 150, 160, 170 and 200 are shown as double pole double throw switches, one pole of which in the case of switches 150, 160 and 170 serves selectively to energize the solenoids 524, 624 and 724 of the respective pattern cam follower units 51, 61 or 71, from a source 210 of electrical potential.

The other pole of each of the switches 150, 160, 170 and 200 is connected to contact 220 of a relay 230. The relay contact 220 is normally closed to a circuit in which the solenoid 824 is wired so that upon depression of any of the push buttons the solenoid 824 of the special cam follower unit 81 will be energized.

The electrical switch 100 is connected electrically between the relay contact 220 and the relay coil 240 so that the relay 230 will be operated as soon as the wobble plate reaches the augmented position. The relay contact 220 will then be shifted to open the circuit to the special cam follower unit solenoid 824 and to close a holding circuit for the relay coil 240.

The present invention therefore, provides for the selection of pattern cams tracked by mechanical cam followers by the operation of electric motor means in response to the simple closure of selected electrical switches. The electrical energy required for such selection can be exceedingly small so that safe low voltage potentials may be used because electrical energy is required only to effect locking action and never is required to provide any increment of the mechanical driving action. Selection of any particular pattern with the arrangement of this invention, moreover, is effected rapidly and may be accomplished during a continued operation of the sewing machine.

Having set forth the nature of this invention, what is claimed herein is:

1. In a sewing machine having stitch forming instrumentalities, mechanism in said sewing machine responsive to pattern information and effective to regulate the operation of at least one of said sewing machine stitch forming instrumentalities in the production of a pattern of stitches, a plurality of individual pattern information carying means associated with said sewing machine and each capable of cooperating with said mechanism to produce a predetermined stitch pattern, pattern sensing means associated with each said pattern information carrying means, electric motor means associated with each pattern sensing means and its associated pattern information carrying means for initiating relative movement between said pattern sensing means and said pattern information carrying means such that pattern information is transmitted to said mechanism, and a plurality of manually operable electric switch means connected to said electric motor means with each said electric switch means being exclusively operable for selecting an individual pattern from said pattern information carrying means.

2. In a sewing machine as recited in claim 1 wherein said pattern information carrying means includes a stack of pattern cams driven by said sewing machine and said pattern sensing means includes a follower mechanism disposed for engagement with each pattern cam and each being operable for transmitting the pattern from a pattern cam to said mechanism.

3. In a sewing machine as recited in claim 2 wherein said electric motor means includes an electromagnetic actuator disposed for operable engagement with said follower mechanism for initiating relative movement between its associated follower mechanism and the associated pattern cam.

4. In a sewing machine having stitch forming instrumentalities, mechanism in said sewing machine effective to regulate the operation of said stitch forming instrumentalities in the production of a pattern of stitches, a stack of pattern cams driven by said sewing machine, an individual cam follower unit interposed between each one of the pattern cams in said stack of pattern cams and said regulating mechanism, each pattern cam follower unit comprising a pair of angularly shiftable levers, a pattern cam tracking finger formed on one of said pair of levers, and a regulating mechanism engaging finger formed on the other of said levers, and pattern selection means comprising individual electric motor means associated with each of said individual cam follower units and operative to render said cam follower units effective and in which said electric motor means comprises a solenoid including an armature rod shiftable when said solenoid is energized into a position interlocking said levers in a relative angular position for transmitting pattern cam information to said regulating mechanism, and operator influenced electric switch means associated one with each of said individual electric motor means.

5. In a sewing machine as set forth in claim 4 in which the pair of levers comprising each pattern cam follower unit are each bell crank levers with substantially equal angular relation between lever arms of the bell crank levers of each pattern cam follower unit, in which a common pivot pin in the sewing machine frame serves as fulcrum for all of the bell crank levers, in which the angle between lever arms of the bell crank levers of adjacent pattern cam follower units is materially different, and in which the solenoids are carried each by a lever arm of one of the pattern cam follower units which extends from the fulcrum at a materially different angle than that of the comparable lever arms of the adjacent pattern cam follower units.

6. In a sewing machine as set forth in claim 4 in which said stack of pattern cams also includes a special cam formed with a cam track having alternate cam surfaces having extreme excursion in opposite directions at least equal to the extreme excursions of any of said pattern cams, a cam follower unit tracking said special cam, and means rendered effective by the closing of any one of said electric switch means for simultaneously energizing the electric motor means associated with the cam follower unit tracking said special cam.

7. In a sewing machine as set forth in claim 6 including an electric circuit rendered effective by operation of said cam follower unit tracking said special cam and operarive to deenergize the electric motor means associated with the cam follower unit tracking said special cam.

8. In a sewing machine as set forth in claim 6 in which the cam track of said special cam is formed with alternate cam surfaces having extreme excursions greater than the extreme excursions of any of said pattern cams.

9. In a sewing machine as set forth in claim 8 including an electric circuit rendered effective by movement of said regulating mechanism in response to an extreme excursion of said special cam and operative to deenergize the electric motor means associated with the cam follower unit tracking said special cam.

* * * * *